Oct. 28, 1952 C. M. KINGHORN Re. 23,568
CLAPBOARD UNIT FOR WALL COVERINGS
Original Filed Jan. 8, 1947 2 SHEETS—SHEET 1
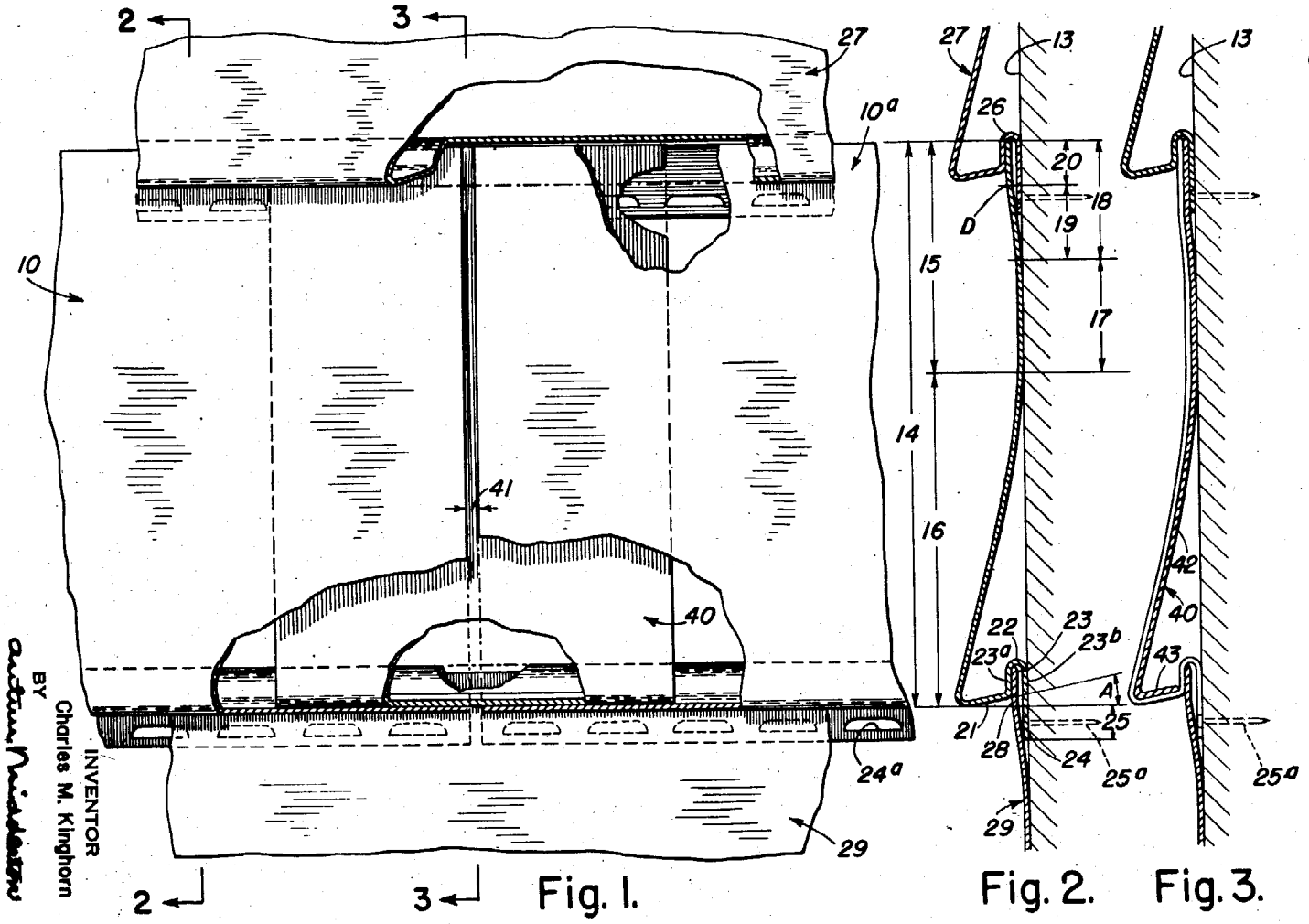
INVENTOR
Charles M. Kinghorn
BY
Arthur Middleton
ATTORNEY CLAPBOARD UNIT FOR WALL COVERINGS
Original Filed Jan. 8, 1947 2 SHEETS—SHEET 2
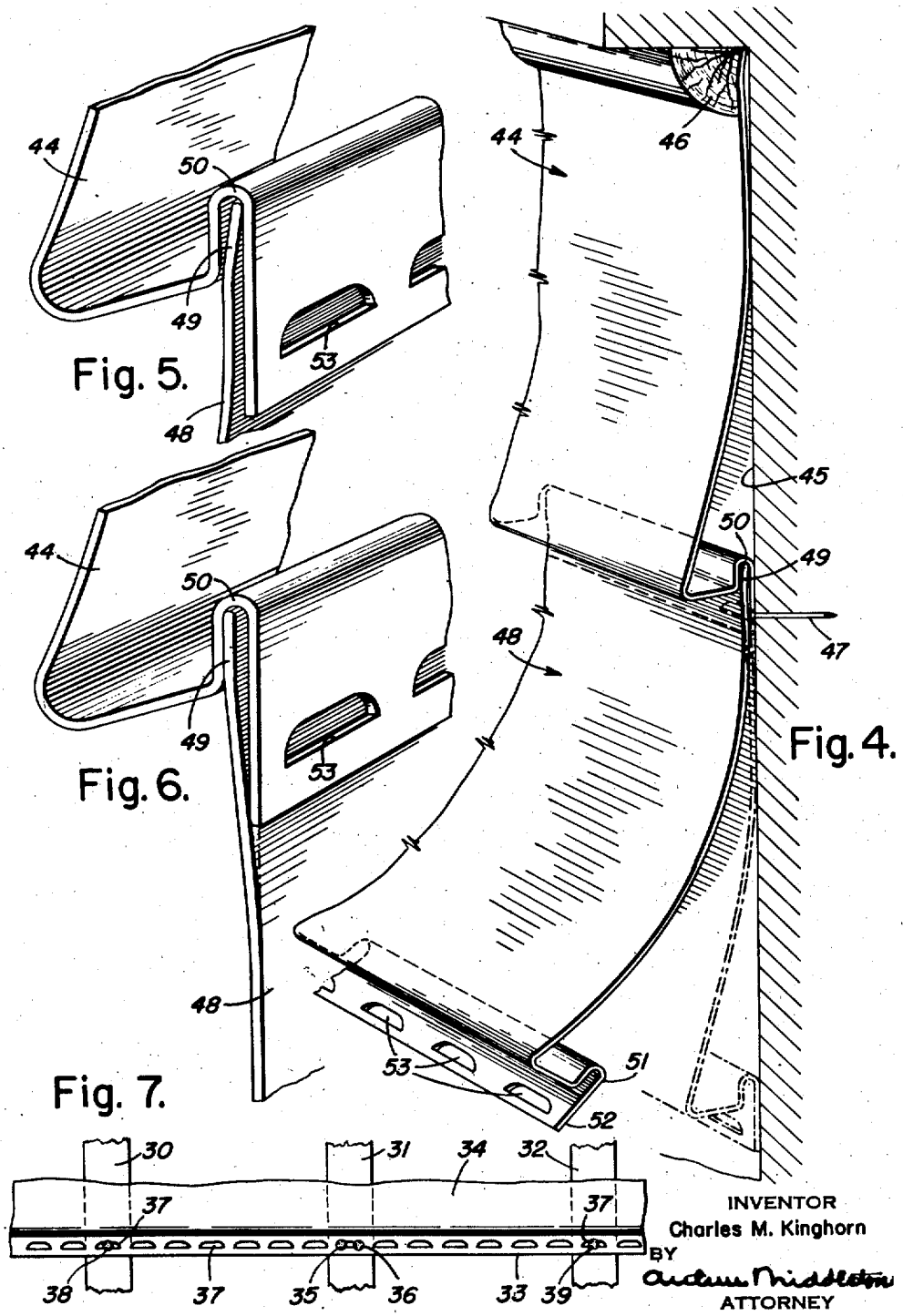
INVENTOR
Charles M. Kinghorn
BY
Andrew Middleton
ATTORNEY Reissued Oct. 28, 1952

Re. 23,568

UNITED STATES PATENT OFFICE 23,568

CLAPBOARD UNIT FOR WALL COVERINGS

Charles M. Kinghorn, Port Chester, N. Y., assignor to Cresswell Roll Forming Company, Limited, Montreal, Quebec, Canada, a corporation of Quebec Original No. 2,477,987, dated August 2, 1949, Serial No. 720,811, January 8, 1947. Application for reissue July 25, 1950, Serial No. 175,833

2 Claims. (Cl. 189—86)

Matter enclosed in heavy brackets [ ] appears in the original patent but forms no part of this reissue specification; matter printed in italics indicates the additions made by reissue.

This invention relates to wall covering or wall-constituting units, such as weatherboards or clapboards, made of formable sheet metal capable of being substituted for such units now usually made of wood. More particularly, the invention resides in the shape or form of the wall unit; in details thereof, including the apertures therein for nails; and in the manner of forming the same.

When one comes to substitute a metal clapboard, for instance, for a wooden clapboard, unexpected difficulties appear. A major difficulty or objection is that if the metal clapboard be shaped like a wooden clapboard, raindrops or sleet falling on the metal clapboard cause noise which might at times reach such severity as to be called a racket. This noise, when long continued can cause a significant nervous irritation on the part of occupants of a house that is made of such clapboards so one of the objects of this invention is to devise ways and means for minimizing such noise and to make such clapboard as nearly noiseless as possible. When such clapboards are made of a more or less readily formable and cheap metal such as aluminum, there is a tendency for such metal to be dented when a stepladder or other solid implement is pressed against it. Therefore, another object of this invention is to devise ways and means for shaping the clapboard so that it normally resists such denting or other localized unsightly deformation. Another object is to devise units that are readily assembled and fastened in place by a novice.

Still another object is to devise means for joining the units together to form a completely water-proof and moisture-proof joint between the assembled units.

Another object is to provide splicing means for abutting clapboard end portions.

These objects are attained by providing a horizontal metal clapboard profile which is internally tensioned by resilient deflection when being fastened to a supporting frame work, and which is so shaped that the upper end interlocks with or engages in a recess formed at the lower end of the preceding clapboard above, and that the recess is formed by a vertical downwardly extending terminal flange portion having perforations for fastening to the frame work.

Other objects are attained by providing elongated perforations in the lower terminal portion of the clapboard, the perforations extending parallel to the bottom edge of the clapboard.

According to one feature the metal clapboard profile has a convex body portion with the lower end thereof protruding outwardly, a horizontal inwardly extending bottom portion terminating in a vertical downwardly extending perforated flange or skirt portion.

According to another feature a splice plate is provided to hug the inner face of the body and horizontal portion of the clapboard profile.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a front view of a clapboard assembly with parts broken away to show splice plate and interlocking connection;

Fig. 2 is a vertical section on the line 2—2 of Fig. 1 through the clapboard assembly outside of a splice plate;

Fig. 3 is a vertical section on the line 3—3 through the clapboard assembly and through a splice plate;

Fig. 4 is a sectional perspective view of a clapboard assembly showing the manner of tensioning the clapboards incident to their being fastened upon a supporting framework;

Figs. 5 and 6 are enlarged detail figures showing the interconnection of a pair of assembled clapboards without- and with tension respectively;

Fig. 7 shows the manner of fastening the skirt portion of a clapboard.

A respective portion of the metal weatherboard or clapboard assembly shows clapboard strip or unit 10 to abut endwise with a clapboard strip or unit 10a representing in effect a horizontal continuation of the formed linear clapboard 10. Associated with the clapboard 10 in interlocking and overlapping relationship are similar clapboard 11 and 12 in the sense that each of the clapboards thus associated with one another has its lower edge portion fastened or nailed to a backing structure 13 while its upper edge portion is retained in an inverted groove formed in and along the lower edge portion of the preceding clapboard above.

The cross-sectional shape or profile of a representative clapboard comprises a substantially vertical body portion 14 presenting in effect a slightly shallow concave outer contour since that body portion comprises a substantially straight upper portion 15 and a lower portion 16 diverging more markedly although steeply from the vertical and outwardly from the backing structure 13. The upper portion 15 in turn may be said to comprise a substantially straight vertical portion 17 appearing to lie against or tangential with respect to the vertical face of the backing structure 13, and a slightly diverging portion 18 terminating in the groove of the clapboard above. The portion 18 in turn may be said to comprise the diverging portion 19 proper and a vertical straighter upper terminal portion 20 appearing to be substantially parallel to the vertical face of the backing structure 13, the line of demarcation between the two portions 19 and 20 being indicated as at D whereby there is defined a very slight or shallow bend at the upper edge portion of the clapboard. The lower end portion of the clapboard profile is formed by an inwardly extending portion 21 which may be said to be substantially or nearly horizontal although it is shown to have a slight or shallow inclination relative to the horizontal as indicated by the angle A. This substantially horizontal or inward portion *or ledge* 21 has at its inner end a folded portion 22 constituting an inverted vertical groove 23 constituted by the walls 23a and 23b thereof.

The wall 23b of the groove extends downwardly to form a vertical terminal skirt portion 24 extending a distance 25 below the lowest point of the inward portion 21 and lies flat against the vertical face of the backing structure 13 to which it is fastened.

The skirt portion 24 has D-shaped horizontally extending elongated apertures 24a which are equidistantly spaced from one another and through which nails 25a may be driven to fasten the skirt portion 24 to the backing structure 13 which for example may be of wood.

The upper edge portion of the clapboard 10 is held in place by being lodged in the lower end grooved portion 26 of a similar associated clapboard 27 which may be mounted upon and fastened to the backing structure in a manner similar to that of clapboard 10.

The lower end portion of clapboard 10 interengages with the upper edge portion 28 of a third similar clapboard 29 by extending into the groove 23 of clapboard 10, the clapboard 29 otherwise being mounted upon and fastened to the backing structure in a manner similar to that of clapboard 10.

A manner of fastening the lower end skirt portion of such a clapboard to a backing structure such as represented by studs, posts or uprights 30, 31 and 32 is shown in Fig. 7. A lower end skirt portion 33 of a clapboard 34 (here fractionally shown) has its middle portion fixed to post 31 by means of a pair of nails 35 and 36 placed in the respective end corners of one of a series of D-shaped and horizontally extending apertures 37. The end portions of this clapboard are shown to be fastened to the respective posts 30 and 32 each by means of a single nail 38 and 39 respectively disposed in the middle of a respective aperture 37. In this way, because of the horizontal disposition and because of the slot-like character of the apertures 37 the clapboard is substantially free to horizontally expand or contract with respect to its fixed middle portion.

In Fig. 1 is further shown a manner of splicing the mutually adjoining ends of the companion clapboards 10 and 10a by means of an inserted splice-plate 40. A somewhat exaggerated space or clearance 41 is shown between the ends of these clapboards. The splice-plate 40 is shaped substantially as the clapboard, that is to say in such a manner that it will hug the rear face or contour of the clapboard except for the grooved portion thereof (as shown in Fig. 3). The splice-plate 40 therefore comprises a concavely shaped generally vertical portion 42 and an inwardly extending foot portion 43.

Figs. 4, 5 and 6 illustrate the manner of assembly and fixing the clapboards upon a backing structure in such a manner that they will be tensioned against the backing structure and so that the clapboards themselves are subjected to internal stresses due to resilient deformation which render them immune to vibrations and the consequent noise which might be caused by the impinging of rain or such upon the outer face of the clapboards.

According to the perspective view in Fig. 4, one clapboard 44 which is similar to the clapboard 10 of Fig. 1 is shown in place, that is fastened to a backing structure 45, its top edge being held by a ledge member or flashing 46, its bottom edge being fastened as by nails 47. A second clapboard 48 is shown in the process of being applied when it is still in its untensioned and therefore more strongly curved state, although with its upper edge portion 49 already loosely lodging in the lower end groove 50 of the clapboard 44 *for limited lateral movement therein* (*see Figures 5 and 6*). This preliminary condition or positioning of the yet untensioned clapboard 48 is more clearly presented in the enlarged detail of Fig. 5, while the tensioned condition in equally enlarged similar detail view is shown in Fig. 6. In the latter position, also shown in Fig. 2, the upper edge 49 (Fig. 6) is caused to bear against the outer face of the groove 26 in moisture-obstructing relationship due to the tension of the concave portion of the clapboard or weatherboard strip acting through flattened portion 17 as a fulcrum.

While thus held position in relation to the clapboard 44 the lower edge portion 51 of clapboard 48 is pressed against the backing structure 45 so that it will assume the more flattened and internally tensioned condition (as indicated in dot-and-dash lines) in which condition it closely resembles the previously attached clapboard 44. Again the lower skirt portion 52 of clapboard 48 will then be held in place by means of nails (not particularly shown) driven through apertures 53. This procedure may be repeated in the course of attaching and fastening successive clapboards by adding them on downwardly one after the other.

This invention offers several features of advantage. Fig. 4, especially in its lower part, illustrates one, namely, the metal weatherboard or clapboard strip 48 has an exposed concave face while presenting a convex face to the building structure 45 or the studding thereof against which the strip is to be secured. The strip 48 of sheet material comprises a main body portion having a longitudinal concavity extending throughout its entire length, which concavity provides said exposed concave face and a back convex face which is presented to the building structure. The body of the strip is so curved that when the straight top marginal portion 20 is emplaced in or against the building structure, the body curves outwardly away from the wall sufficiently so that the laterally projecting bottom marginal portion 21 (Fig. 2) is out of contact with and is spaced from the building structure a distance far enough to allow the operator's hand to remain on that bottom marginal portion until the strip or unit has the edge of the top marginal portion 20 seated in place. Thereafter, when the depending apertured skirt 24 is nailed or otherwise fixed to the building structure 13, as shown in Fig. 2, and as can be seen in Figs. 4 and 6, there is a face-to-face contact between the building structure and the skirt, and there is tangential contact between the building structure and the convex wall-facing face of the strip, while the corresponding face of the top portion 49 is pressed away from the building structure as a result of such contacts and the flattening of a portion of the longitudinal concavity of the main body of the strip and the consequent lessened curvature of the strip.

Attention is directed to the fact that the normal degree of curvature of the weatherboard or strip as formed, is significantly lessened and rendered abnormal—indeed, somewhat or partially deformed into providing the flattened section 17 (Fig. 2) that serves as a fulcrum through which the tension on the curved lower section of the strip acts to maintain the top portion 49 (Fig. 6) of the strip forced away from the building structure and against the outer side or wall of the groove in the fold 50 of the bottom portion of the superjacent strip or unit. This arrangement and functioning gives such strength to the strip for resisting indentation that such strips can be applied directly to the wall studding without any intermediate sheathing or other boards.

Now as to the splice- or joint-plates 40 for use behind joints in the linear strips: They are disposed bridgingly on the convex side of abutting edges of two aligned strips. These joint-plates 40 are pieces of metal or other sheet material having a main body and a bottom extension 43 that extends toward the building structure. These plates are of such a size, as shown in Figs. 1 and 3, that irrespective of its original curved shape, when so positioned and incorporated into the building structure, the upper free edge of the plate also enters the groove 50 of the fold 26 of the superjacent strip (along with the upper edge of the strips in front of the joint-plate 40). Meanwhile, the edge of the lateral extension 43 of the plate bears against the outer side of the fold of the plate-contacting strips 10 and 10a, and the body of the plate has its upper portion pressed and tensioned against the building structure as a result of the tensioned and deformed curvature of the plate-contacting strips whereby the joint-plate has forced curvature, as at 42 in Fig. 3, to correspond to the tensioned curvature of the plate-contacting strips and forced pressure between substantially its entire outer surface and the inner convex surfaces of the plate-contacting strips as a result of the tensioned curvature and deformed shape of those strips.

These linear formed weatherboard strips or units, while primarily designed for use as weatherboards or clapboards or siding on vertical building structures because they cast horizontally extending shadows, can, with equal facility and advantage, be used on roof structures where it is satisfactory to simulate somewhat horizontal shadow lines usually associated with shingle construction.

The curvature of the weatherboard strips has an unexpected effect of reflecting noisy sounds so that houses built of such strips are quieter than wooden or brick houses. The heat-reflective properties of the curved strips also make a house built of them cooler in summer and warmer in winter than a corresponding wooden house.

I claim:

[1. As a new article of manufacture, a sheet metal section for siding, roofing and the like consisting of a main body curved transversely from one side edge of the body to the opposite side edge thereof and presenting a front concave face and an inner convex face, said body being provided at one of its side edges with a contact face portion and having at its opposite side edge a projecting attaching portion extending from the inner face of the main body and provided with a groove, the curvature of the main body causing deformation and tensioning of the same and a pressure contact of the contact face portion when the main body is arranged against a fixed structure and the contact face portion and the projecting attaching portions are arranged contiguous to said structure.]

[2. A weatherboard construction unit for the sides and roof of building structures comprising a linearly extending metal strip composed of a main body curved transversely from one side to the other and presenting an outer concave face and an inner convex face, said body being provided at one side with a contact face portion and having at the opposite side an attaching portion projecting from the inner face of the body and extending longitudinally thereof and having a longitudinal groove, the curvature of the main body causing deformation, tensioning and stiffening of the same and a pressure contact of the contact face portion when the main body is arranged against a building structure and the contact face portion and the attaching portion are brought closely adjacent said structure.]

*3. A clapboard assembly for a building, comprising a plurality of linearly-extending tension-stiffened clapboard units of resiliently-deformable springy sheet metal contiguously and overlappingly arranged one above the other against a fixed support wherein each unit is cross-sectionally uniform both as to thickness and shape and includes a main body having an intermediate portion pressed into direct flat contact with the fixed support and therebelow a lower curved portion directed away from the fixed structure followed by a bend inwardly providing a ledge merging into a fold rising upwardly from the ledge to provide an inverted vertical groove substantially wider than the thickness of the unit with the free sidewall of the groove terminating in a marginal skirt in contact with the fixed structure, said main body having above the flat contact portion an upper curved portion also directed away from the fixed structure but to a lesser extent than said bottom curved portion and terminating in a flat marginal top portion set at a rearward angle to the upper curved portion, said last mentioned element of the subjacent unit projecting between the side walls of the groove of the superjacent unit for a limited lateral movement therebetween and with the outer face only of the said top portion in moisture-obstructing contact with that side wall of the fold*

*that is farthest removed from the fixed support, the upper and the lower curved portions of the unit being thus under significant laterally-exerted tension from the flat contact portion as a fulcrum so as to be less curved than during the initial normal curvature of the unit when unemplaced, whereby as emplaced each clapboard unit is tension-deformed for maximizing stiffening thereof while minimizing noise-reflection.*

*4. A clapboard unit for use on a building and adapted to cooperate with a plurality of similar linearly-extending tension-stiffened clapboard units of resiliently-deformable springy sheet metal contiguously and overlappingly arranged one above the other against a fixed support wherein the unit is linearly-extending resilient deformable springy sheet metal cross-sectionally uniform both as to thickness and shape and includes a main body comprising an intermediate portion to be pressed when emplaced into direct flat contact with the fixed support and therebelow a lower outwardly curved portion to be directed away from the fixed structure followed by a bend inwardly providing a ledge merging into a fold rising upwardly from the ledge providing an inverted vertical groove consisting of a rising wall and a descending free side wall spaced substantially wider apart than the thickness of the unit with the free side wall of the groove terminating in a marginal skirt to be placed in contact with the fixed structure, said main body having above the intermediate portion an upper outwardly curved portion to be directed away from the fixed structure but to a lesser extent than said bottom curved portion and terminating in a flat marginal top portion set at an inwardly directed angle to the upper curved portion, said last mentioned*

*element adapted to project into and between the walls of the vertical groove of the next contiguous unit for a limited lateral movement therebetween with the outer face only of said top portion in moisture-obstructing contact with that side wall of the groove that is farthest removed from the fixed support, the upper and the lower curved portions of the unit thus to be under significant laterally-exerted tension from the flat contact portion as a fulcrum so as to be less curved than during the initial normal curvature of the unit, whereby as emplaced each clapboard unit is tension-deformed for maximizing stiffening thereof while minimizing noise-reflection.*

CHARLES M. KINGHORN.

REFERENCES CITED

The following references are of record in the file of this patent or the original patent:

UNITED STATES PATENTS

| Number | Name | Date |
|---|---|---|
| 214,027 | Currier | Apr. 8, 1879 |
| 343,775 | Ottiwell | June 15, 1886 |
| 720,893 | Charlebois | Feb. 17, 1903 |
| 1,110,238 | Spiegel | Sept. 8, 1914 |
| 1,666,115 | Bonsall | Apr. 17, 1928 |
| 2,095,533 | Schmidt | Oct. 12, 1937 |
| 2,167,816 | Small | Aug. 1, 1939 |
| 2,180,317 | Davis | Nov. 14, 1939 |
| 2,227,535 | Crabtree | Jan. 7, 1941 |
| 2,476,451 | Murphy et al. | July 19, 1949 |

FOREIGN PATENTS

| Number | Country | Date |
|---|---|---|
| 5,231 | Great Britain | of 1887 |